(12) United States Patent
Noah

(10) Patent No.: US 6,533,026 B1
(45) Date of Patent: Mar. 18, 2003

(54) HEAT REMOVING SYSTEM

(76) Inventor: Norman C. Noah, 4060 Bethania Station Rd., Winston-Salem, NC (US) 27106

( * ) Notice: Subject to any disclaimer, the term of this patent is extended or adjusted under 35 U.S.C. 154(b) by 0 days.

(21) Appl. No.: 09/970,413

(22) Filed: Jan. 14, 2002

(51) Int. Cl.$^7$ ............................................... F25B 29/00
(52) U.S. Cl. ...................... 165/48.2; 62/238.6; 126/572
(58) Field of Search ...................... 165/48.2; 126/572, 126/621, 623, 714; 62/238.6, 278.7; 52/173.3

(56) References Cited

U.S. PATENT DOCUMENTS

| | | | | |
|---|---|---|---|---|
| 4,051,999 A | * | 10/1977 | Granger et al. | 126/400 |
| 4,227,566 A | * | 10/1980 | Stilber | 126/629 |
| 4,254,822 A | * | 3/1981 | Geier | 126/622 |
| 4,437,511 A | * | 3/1984 | Sheridan | 126/572 |
| 4,517,958 A | * | 5/1985 | Worf | 126/630 |
| 5,014,770 A | | 5/1991 | Palmer | |
| 5,452,710 A | * | 9/1995 | Palmer | 126/572 |
| 6,225,705 B1 | * | 5/2001 | Nakamats | 290/1 R |

* cited by examiner

*Primary Examiner*—William C. Doerrler

(57) ABSTRACT

This is a heating and cooling system, and method that utilizes the roof of a home or building as a solar collector. A heat barrier material is secured to the inside free edges of the roof rafters to reflect radiant heat into air flow passage ways formed between the rafters, the attic side of the roof and the heat barrier materials. A loft or upper attic floor is built in the upper portion of the attic and is also covered with the heat barrier material. The attic is divided into separate areas that are connected by a ducting system that includes a filter, an evaporator and a blower. The blower produces airflow through the filter and over the evaporator coil and into a separated portion of the attic. Airflow moves through selected formed channels between rafters, barrier material and inside roof to the blower for re-circulation. This closed loop system is usable with conventional air-to-air heat pump systems, with portions of such systems or with other well-known devices such as heat exchangers and heat engines.

18 Claims, 16 Drawing Sheets

Cooling

Heating

Heating Water

Attic System Used to Heat Water or other Medium
(e.g. Absorption Refrigeration)

Heat Powered Generator

HEAT REMOVING SYSTEM

BACKGROUND OF THE INVENTION

1. Field of the Invention

The present invention relates to improvements in heating and cooling systems and more particularly to a system using up to the entire roof of a home or building as a solar collector by isolating a portion of the attic and utilizing a blower, evaporator and filter to draw heated air over the evaporator coil, exhausting the heat in various ways and returning it to be recycled.

2. Description of the Prior Art

Numerous attempts have been made to utilize the heat that builds in the attic of a home or building in a meaningful way to improve heating and cooling efficiency or produce power for other uses. A common approach has been to utilize solar panels for the generation of heat and energy from the sun, but usually these panels must be placed on the roof of the structure in order to operate in the most efficient manner possible. Solar panels are very expensive, and the placement of numerous panels on the roof of a structure detracts from the structure's appearance to a considerable degree.

Other attempts to utilize the heat normally building in the attic of a home involve costly additions to the home or significant modification to existing structure, in order to attempt to improve the heating and cooling capacity. Even then increased efficiencies are not significant. Numerous other attempts to improve certain features of the heating or cooling portions of a heat pump unit have been attempted. See for example U.S. Pat. Nos. 4,005,583; 4,030,312 and 4,163,369. These dwell on the improvement of certain features to provide, for example, increased efficiency in the heating capacity of an air-to-air heat pump system in cold weather. No significant improvements have been yet found that will utilize the high temperatures normally experienced in the attics of homes during hot weather or other energy saving activities that can be associated therewith. It is to this critical need that the present invention is directed.

OBJECTIVES AND BRIEF SUMMARY OF THE INVENTION

From the foregoing, it is apparent that a primary objective of the present invention is to provide an improvement in heating and cooling systems that include all of the advantages of prior art devices and more and none of the disadvantages.

Another objective of the present invention is to provide a system for improved heating and cooling capabilities that can be retrofitted to existing heating and cooling systems.

Yet another objective of the present invention is to provide an improved heating and cooling system that will advantageously utilize the accumulated heat energy normally found in the attics of homes and buildings particularly during the hot summer months and especially in the space between roof rafters, the roof inside surface and a barrier material attached to the free inside edges of the roof rafters.

A further objective of the present invention is to provide a system of the type described which is less expensive than the utilization of solar panels to convert heat energy into other usable energy forms.

Yet a further objective of the present invention is to provide an improvement in a heating and cooling system of the type described which can be used to bring the temperature of air in the attic of a residence or building near the temperature of the outside air thereby making the attic a more user friendly location throughout the year.

Still another further objective of the present invention is to provide a heating and cooling system of the type described which can be used with a heat exchanger to pre-heat water for household needs and swimming pools.

Yet another objective of the present invention is to provide a heating and cooling system of the type described that can be used in conjunction with a heat engine to drive a compressor or a generator and produce electric current for residential or other use.

From these objectives it can be seen that the present invention includes a heating and cooling system that utilizes the roof of a home or building as a solar collector. A heat barrier is secured to the free inside edges of the roof rafters to reflect radiant heat into air spaces formed between the rafters, the attic side of the roof and the heat barrier materials. A loft or upper attic floor is built in the upper portion of the attic that is also covered with the heat barrier material. Thus airflow channels are formed between the rafters of the roof, the heat barrier materials and the inside surface of the roof. A liquid refrigerant is moved under pressure through a heated evaporated coil where it becomes a heated vapor under pressure that can be used in various ways.

In one embodiment, the loft is separated transversely into two sections, and the sections are connected by a ducting system that includes a filter, an evaporator and a blower. The blower produces airflow through the filter and through the evaporator coil through the balance of the duct system and into the second separated portion of the loft. Airflow continues down selected formed channels between rafters, barrier material and inside roof to the boxed in eave where it moves to the other end and flows up the selected formed channels between rafters, barrier material and inside roof to the first separated portion of the loft to be re-circulated by the blower. This closed loop system can be used in conjunction with a conventional air-to-air heat pump system, with portions of such a system or with other well known devices such as heat exchangers and heat engines.

In a second embodiment, the attic loft is divided longitudinally, and two separate systems like the first embodiment are installed. The system on the hotter roof slope in this embodiment runs until the other roof slope temperature reaches a higher temperature. The first system then shuts down, and the second system commences.

The present invention is easily applied to existing heat pump installations where it can supplement or replace the existing heat pump system when conditions are appropriate, or it can be bypassed to let the conventional system operate in its usual way.

Thus there has been outlined the more important features of the invention in order that the detailed description that follows may be better understood and in order that the present contribution to the art may be better appreciated. There are, of course, additional features of the invention that will be described hereinafter and which will form the subject matter of the claims appended hereto. In that respect, before explaining at least one embodiment of the invention in detail, it is to be understood that the invention is not limited in its arrangement of the components set forth in the following description and illustrated in the drawings. The invention is capable of other embodiments and of being practiced and carried out in various ways.

It is also to be understood that the phraseology and terminology employed herein are for the purpose of description and should not be regarded as limiting in any respect. Those skilled in the art will appreciate that the concept upon which this disclosure is based may readily be utilized as a basis for designing other structures, methods and systems for carrying out the several purposes of this development. It is important that the claims be regarded as including such equivalent methods and products resulting therefrom that do not depart from the spirit and scope of the present invention. The application is neither intended to define the invention, which is measured by its claims, nor to limit its scope in any way.

Thus, the objects of the invention set forth above, along with the various features of novelty, which characterize the invention, are noted with particularity in the claims annexed to and forming a part of this disclosure. For a better understanding of the invention, its operating advantages and the specific results obtained by its use, reference should be made to the following detailed specification taken in conjunction with the accompanying drawings wherein like Characters of reference designate like parts throughout the several views.

The drawings are included to provide a further understanding of the invention and are incorporated in and constitute a part of this specification. They illustrate embodiments of the invention and, together with their description, serve to explain the principles of the invention.

DETAILED DESCRIPTION OF THE PREFERRED EMBODIMENT

Figure 1:
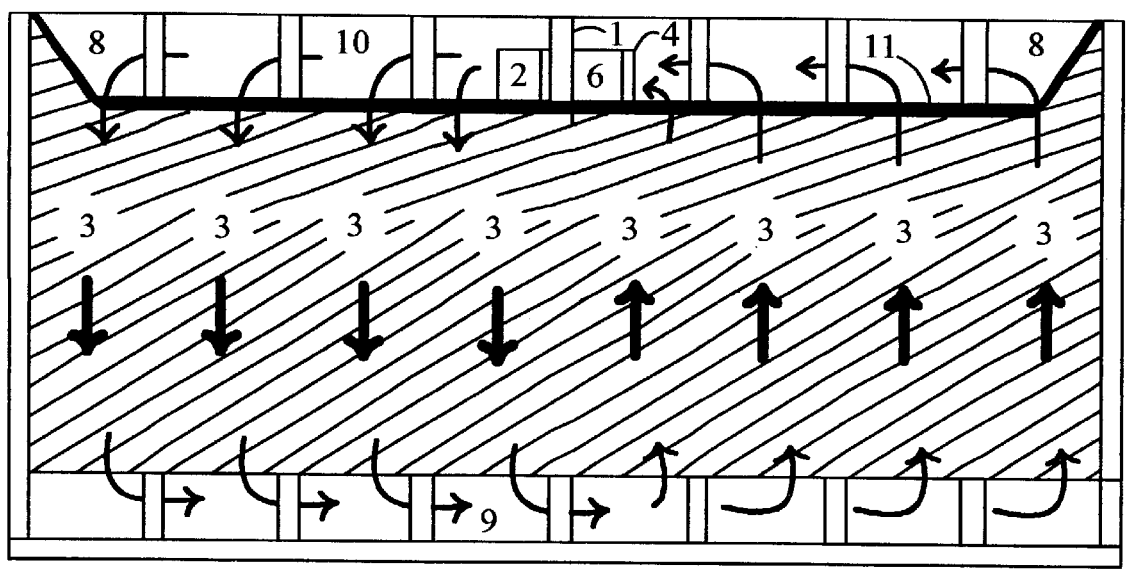
FIG. 1 is a side elevational cut away view of the attic portion of a residential structure showing the loft section above the upper attic floor divided transversely into two separate portions, the installed filter, evaporator, blower and duct circuit and the formed air flow channels between the roof rafters, the barrier materials and the inside roof.
Figure 2:
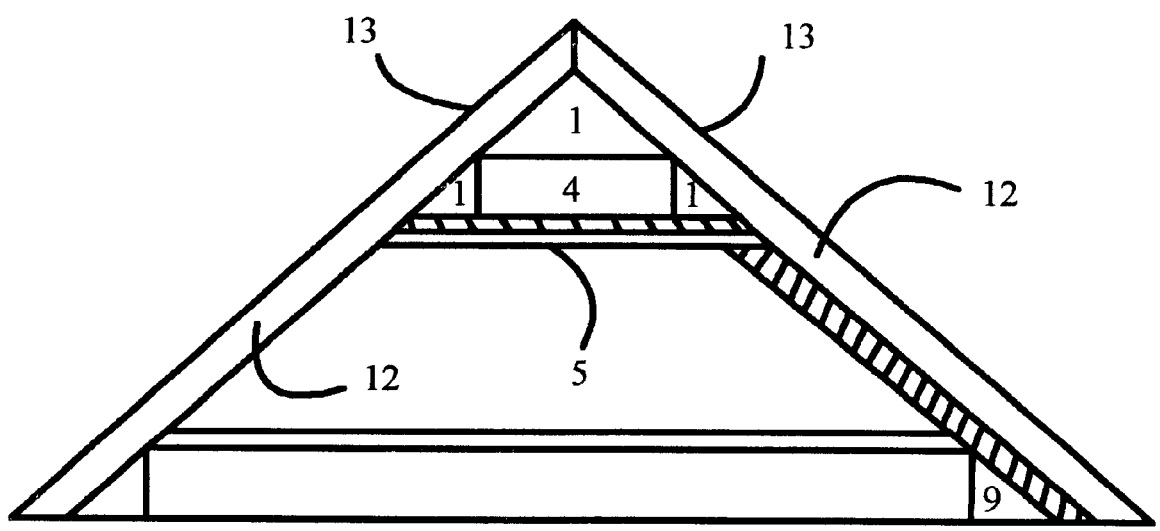
FIG. 2 is an end elevational view of the attic portion shown in FIG. 1 showing the application of the heat barrier materials within the attic for a residence having substantially North and South roof slopes.
Figure 3:
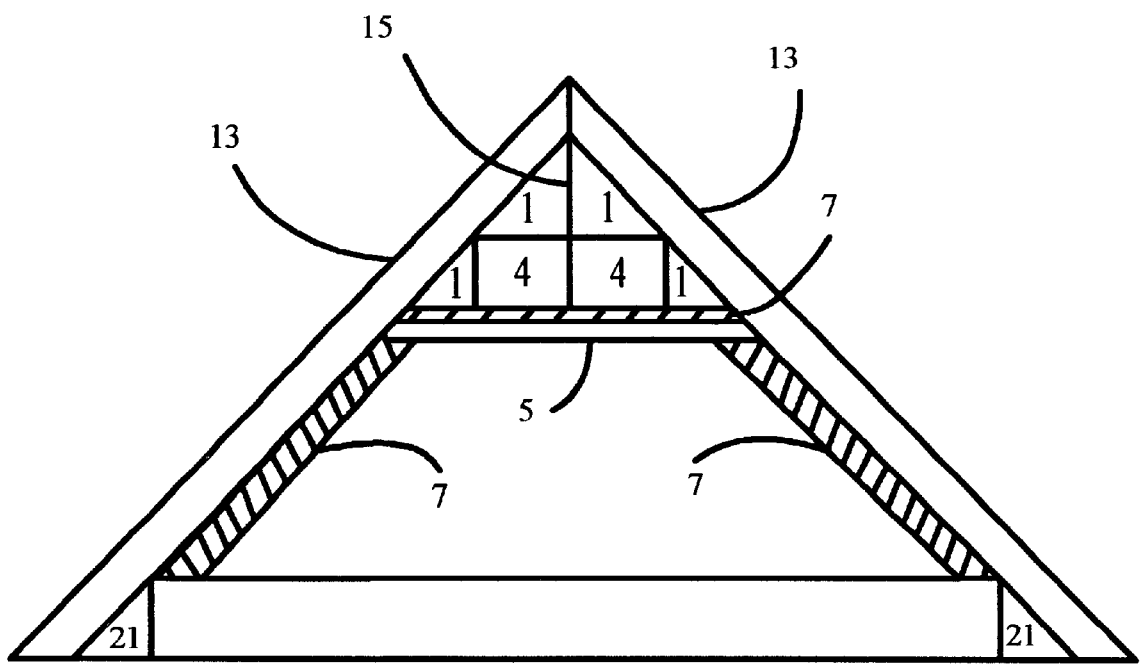
FIG. 3 is an end elevation view of the structure shown in FIG. 4.
Figure 4:
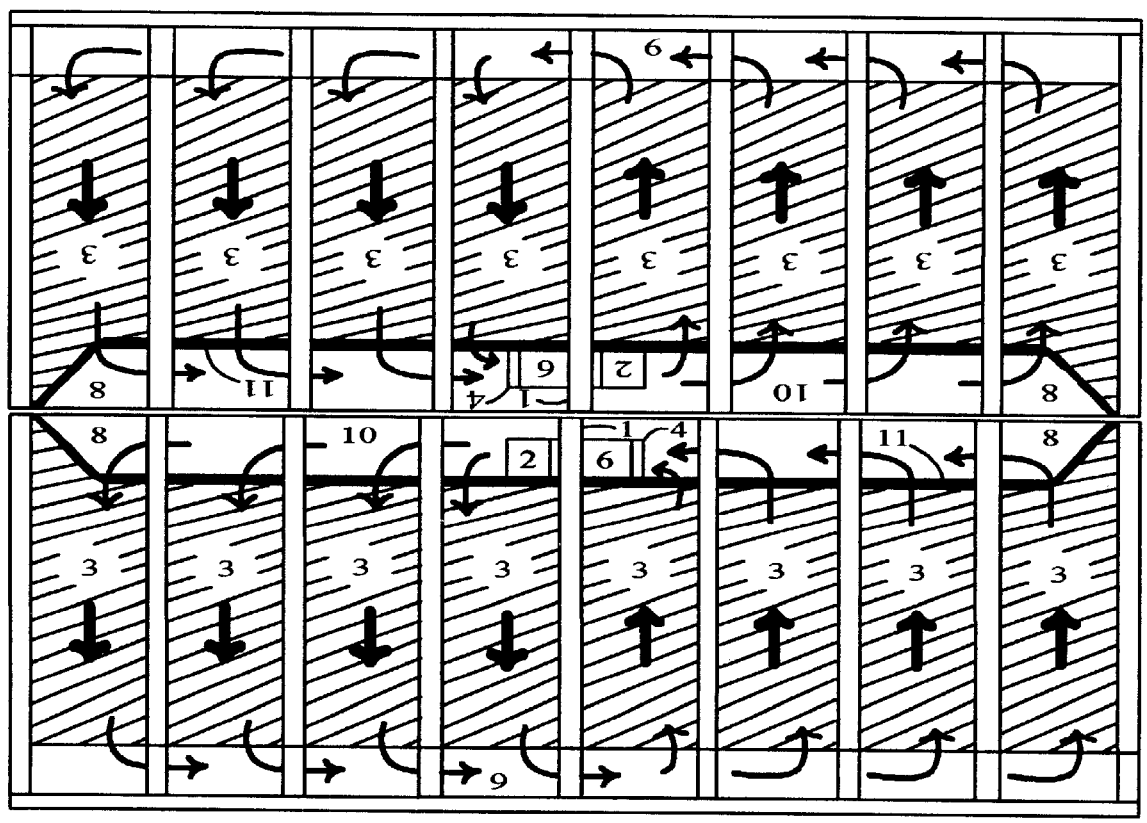
FIG. 4 is a top plan view of the attic of a residence having substantially East and West roof slopes in which two systems of the present invention are installed.

Referring now to the drawings and particularly to FIG. 1, an attic of a house or building is provided with a closed loft 8 in a small area at the very peak of the roof and extending throughout the entire attic area. An upper attic floor 5 is formed in the loft to isolate it from the rest of the attic and is subsequently covered with a heat barrier material 7 (FIG. 2). Heat barrier material 7 is also applied to the interior side of the rafters 12 as shown.

The loft or area above floor 5 is separated by baffle 1 so that it becomes divided transversely into separate and isolated areas 10, 11. The placement of heat barrier sheet material 7 on the interior side of roof rafters 12 effectively forms airflow channels 3 between roof 13 and the heat barrier material 7 to accommodate airflow.

A connecting duct way joins the two separated areas 10, 11 of the loft, and in one separated area 11 is positioned a filter 4 and an evaporator coil 6 followed by a blower 2 as shown. The outside end of blower 2 opens into area 10.

When blower 2 is actuated, airflow is induced from one separated area 11 through filter 4 across evaporator coil 6 and through duct way in baffle 1 into the other separated area 10. The airflow in this arrangement is a closed loop with flow induced across filter 4 and evaporator coil 6, the air coming upward in the channels 3 formed between roof rafters 12 from the passageway 9 formed where the roof 13 intersects the attic floor and sidewalls of the house through channels 3 and into area 11 and then downwardly through the formed airflow channels 3 between roof rafters 12 and back into passageway 9. Thus, there is a continuous flow of air through airflow channels 3 coming upwardly into area 11 through filter 4 and evaporator coil 6 and then on into area 10 and then down through airflow channels 3 and back to air passageway 9.

The unique structure of the attic as described provides the basis for a number of embellishments to existing heating and cooling systems for houses and buildings. For example, the present system can be combined with a conventional air-to-air heating and cooling system. Slight modifications are made in the conventional air-to-air heat pump configuration such as providing a modified reversing valve, a normally closed solenoid valve and a normally open solenoid valve. Other novel applications of the system of the present invention will be described hereinafter.

Figure 5:
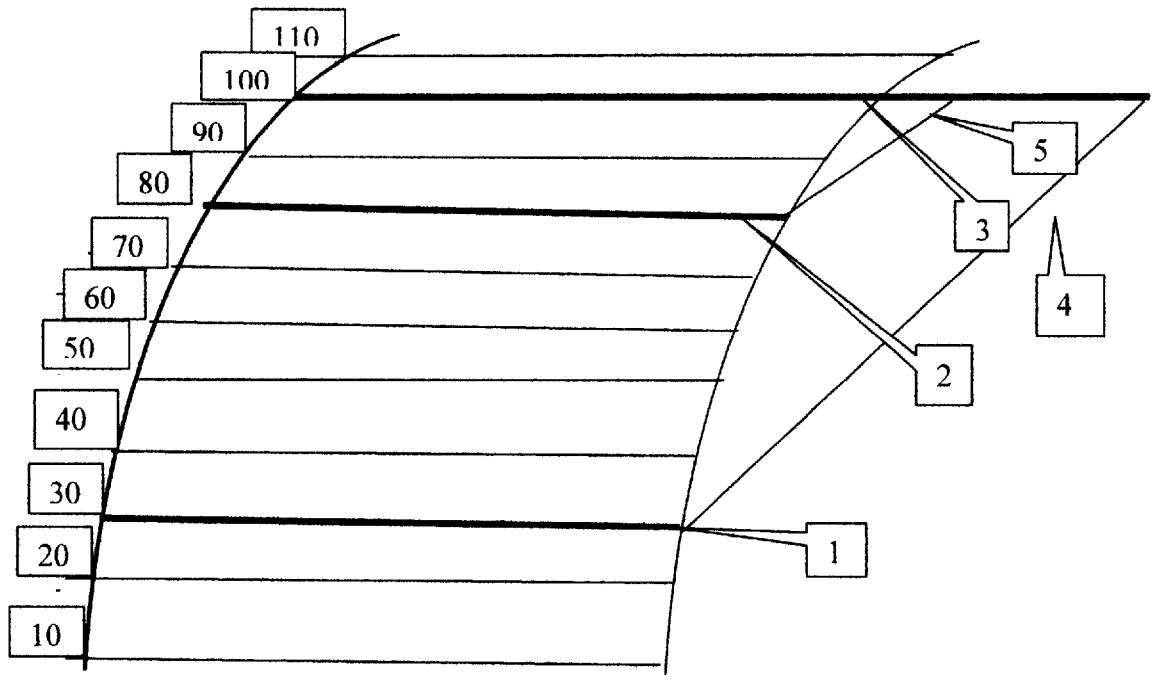
FIG. 5 is a pressure-enthalpy diagram for refrigerant Freon-22.

As an example of the system's value and efficiency, reference is made to the pressure-enthalpy diagram of FIG. 5. With the system connected in combination with a conventional air-to-air heat pump but with only the heat pump running, assume the heat pick-up by the outside evaporator coil is 30 degrees F. (outside temperature) and shown as the blue line and the condenser is condensing at 110 degrees F. to achieve the desired temperature inside and shown as the red line. The compressor work is shown as the longer green line. When the system of the present invention is activated with the heat pump, the attic evaporator heat pick-up is 80 degrees F. and shown as the orange line. The shorter green line represents the compressor work required of the conventional heat pump. Thus the compressor work required in the heat pump is significantly less when the system of the present invention is acting in concert with it.

Figure 6:
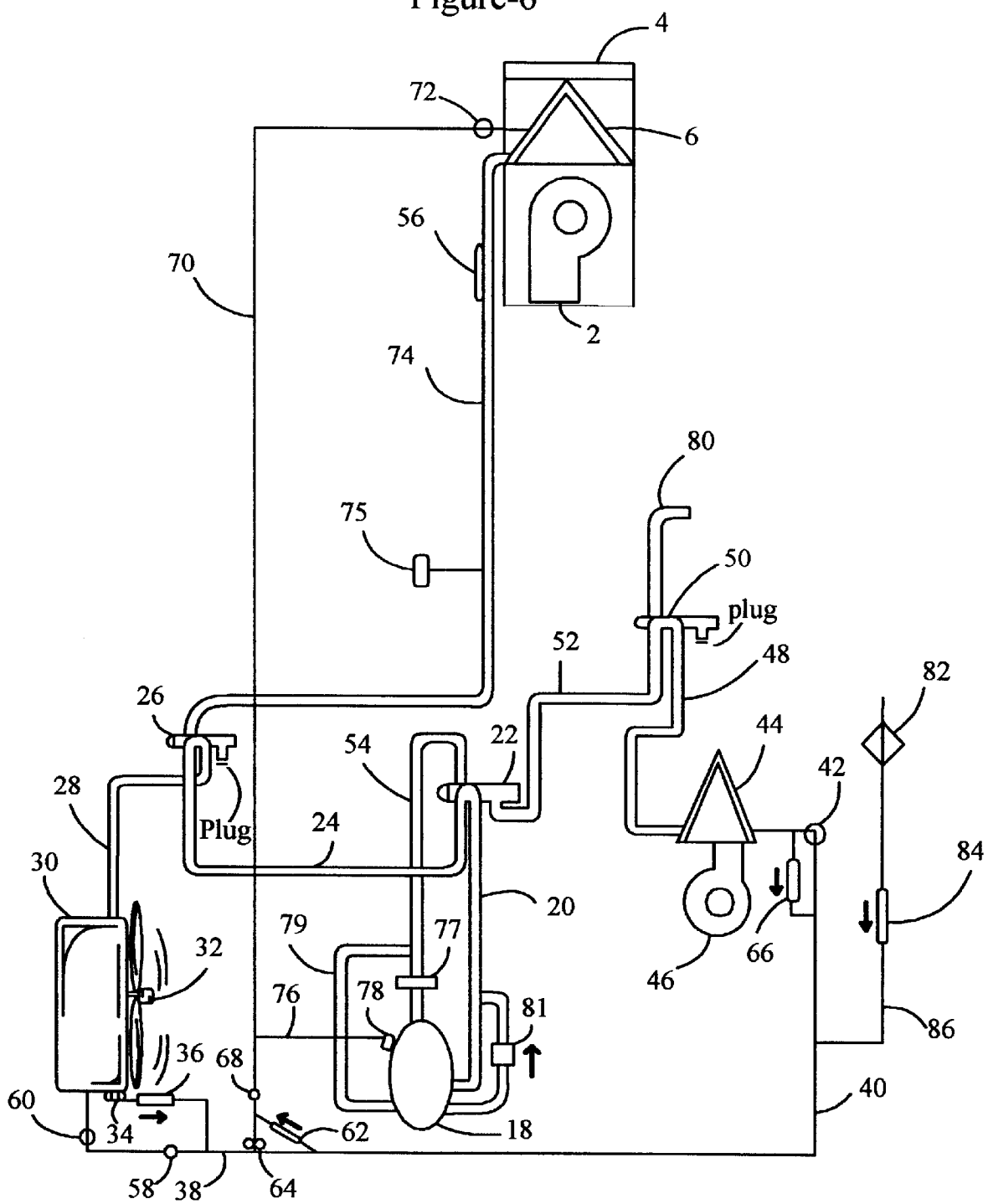
FIG. 6 is a schematic diagram of the present invention in combination with a conventional air-to-air heat pump with only the conventional heat pump being operated in the cooling mode.

In the system shown in FIG. 6, the system of the present invention is connected with a conventional air-to-air heat pump, but only the heat pump is activated to operate in a conventional manner. Here a thermostat energizes reversing valve 22 that shifts the heat pump to a cooling mode, turns on fan 32, blower 46 and through sensor 75 compressor 18. Compressor 18 compresses vapor to line 20 through reversing valve 22 to line 24 through reversing valve 26 to line 28 through condenser 30 where heat is removed by fan 32 and exits as a liquid and travels through pressure control valve 34 through one-way valve 36 to line 38 to line 40 through expansion valve 42 and Through the evaporator coil 44 where heat is picked up by blower 46 to line 48 through reversing valve 50 to line 52 through reversing valve 22 to line 54 through valve 77 to compressor 18 to be recycled.

Figure 7:
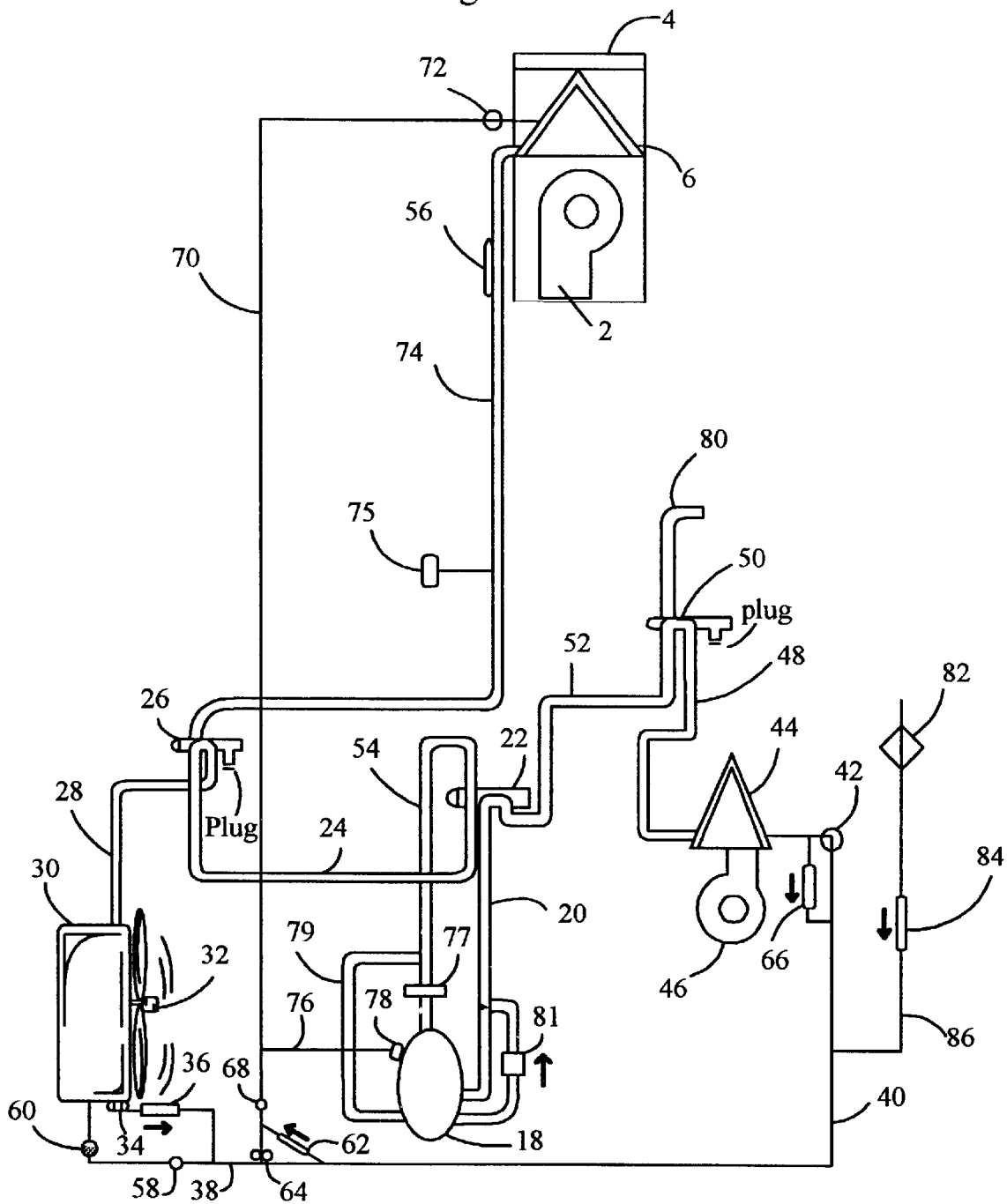
FIG. 7 is a schematic diagram of the system of the present invention in combination with a conventional air-to-air heat pump with only the conventional heat pump being operated in the heating mode.

In FIG. 7, the heat pump is activated in a normal heating cycle with the system of the present invention installed but inactive. Here the thermostat energizes the water heater thermostat isolation switch, turns on fan 32, blower 46 and through sensor 75 compressor 18. Compressor 18 compresses vapor to line 20 through reversing valve 22 to line 52 through reversing valve 50 to line 48 through condenser 44 where heat is removed by blower 46 and as a liquid travels through one-way valve 66 to line 40 to line 38 through valve 58 through expansion valve 60 through evaporator coil 30 where heat is picked up by fan 32 and exits as a vapor to line 28 through reversing valve 26 to line 24 through reversing valve 22 to line 54 through valve 77 to compressor 18 to be recycled.

Figure 8:
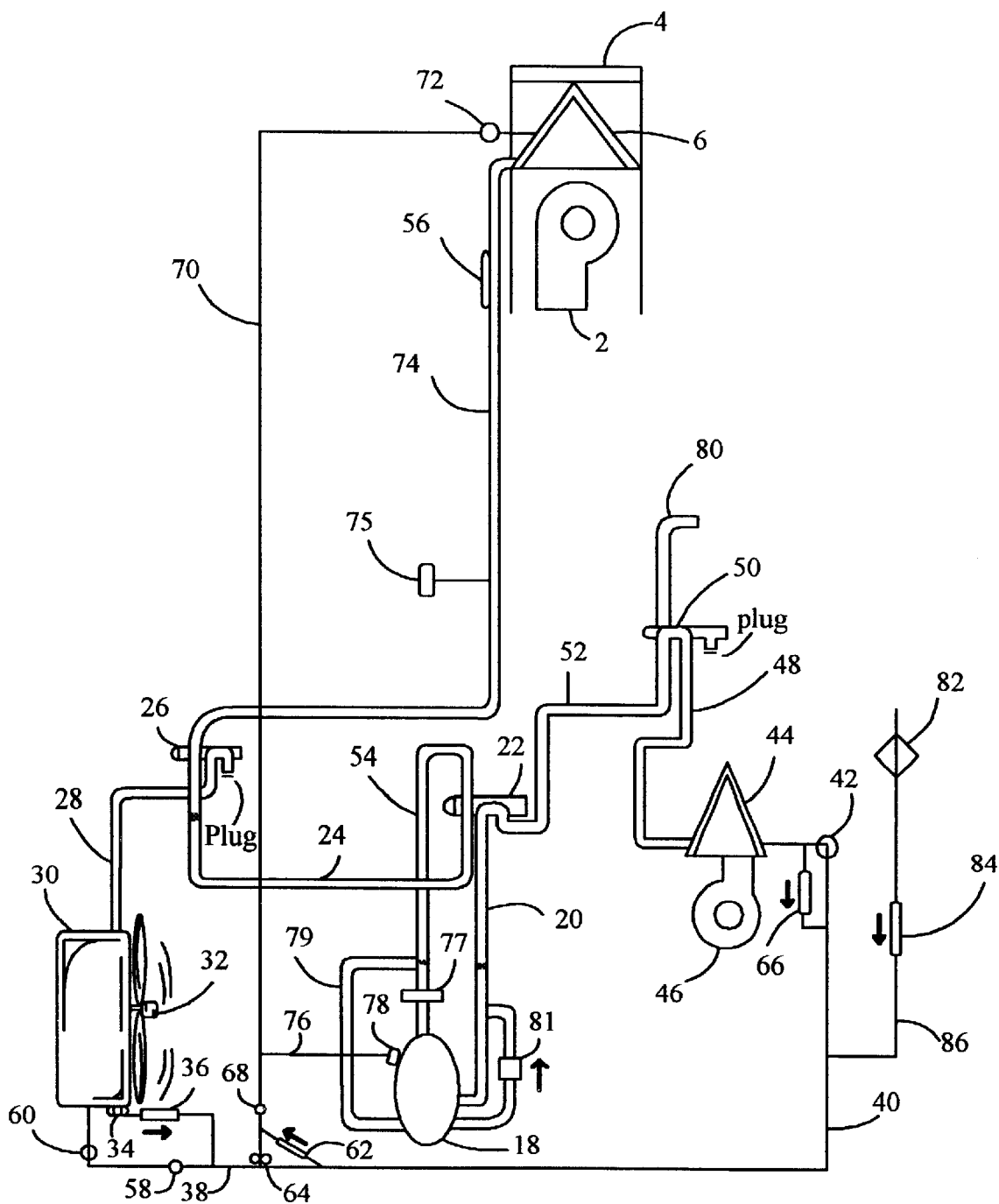
FIG. 8 is a schematic diagram of the system of the present invention in an activated condition with the outside condenser and fan being bypassed.

FIG. 8 shows the system of the present invention utilizing a part of the conventional heat pump. Here sensor 56 senses attic evaporator coil 6 to be a higher temperature than outside evaporator coil 30, shifts reversing valve 26 to attic mode, closes valve 58, opens valve 68, and turns off fan 32. The thermostat energizes the water heater thermostat isolation switch, turns on blower 2, blower 46, and through sensor 75 turns on compressor 18. Compressor 18 compresses hot vapor to line 20 through reversing valve 22 to line 52 through reversing valve 50 to line 48 through condenser 44 where heat is removed by blower 46 and exits as a liquid through one-way valve 66 to line 40 through bypass valve 62 through valve 68 to line 70 through expansion valve 72 through evaporator coil 6 where it picks up heat by blower 2 and exits as a hot vapor to line 74 through reversing valve 26 to line 24 through reversing valve 22 to line 54 through valve 77 to compressor 18, which is cooled through line 76 and temperature sensor 78, to be recycled.

Figure 9:
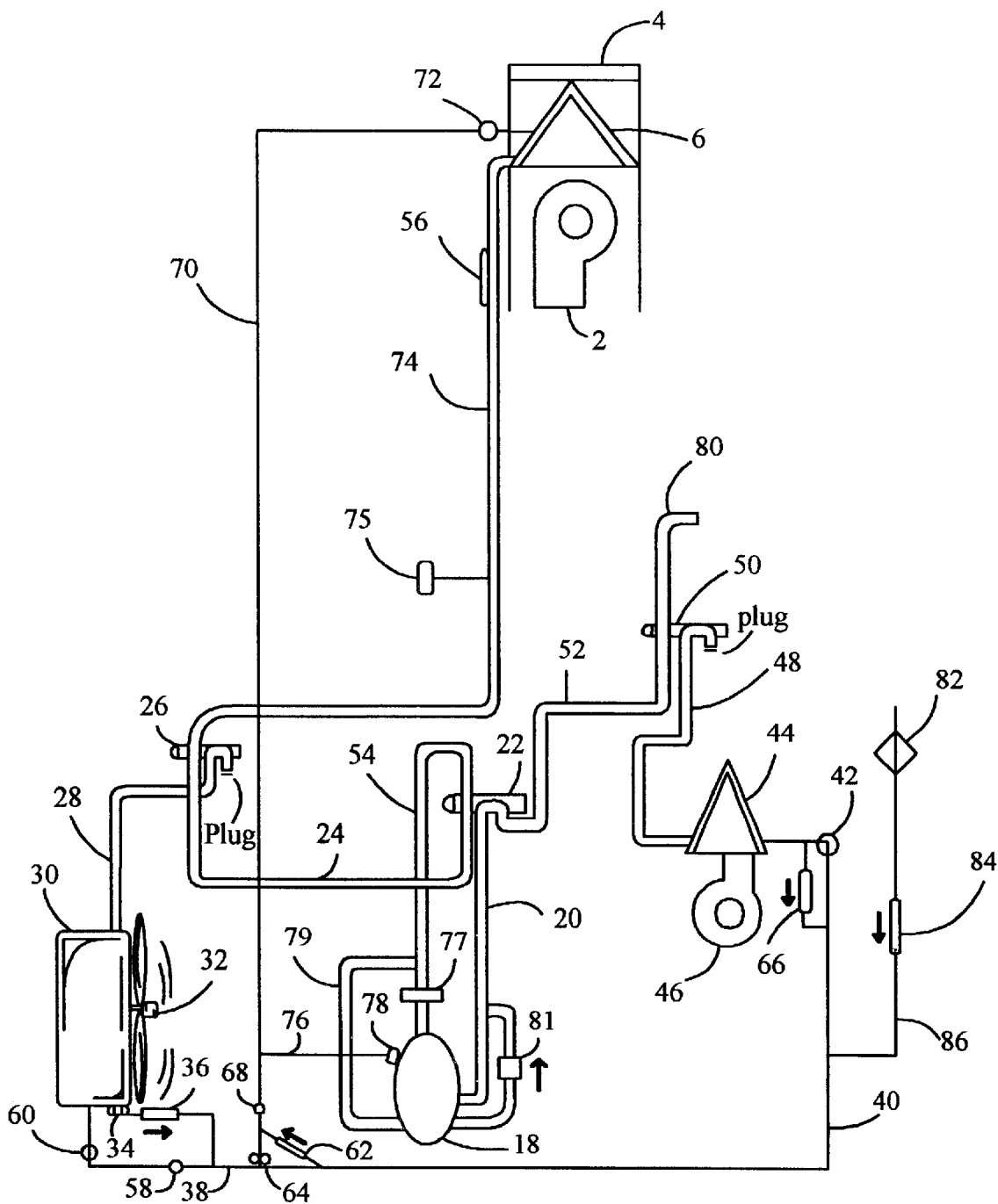
FIG. 9 is a schematic view like that shown in FIG. 8 with the compressor heating water.

FIG. 9 shows the system of the present invention used with the conventional heat pump during the heat cycle to heat water. Here sensor 56 senses attic evaporator coil 6 to be a higher temperature than outside evaporator coil 30, shifts reversing valve 26 to attic mode, closes valve 58, opens valve 68, and turns off fan 32. The water heater thermostat shifts reversing valve 50 to water heat mode, and through sensor 56 turns on blower 2, and through sensor 75 turns on compressor 18. Compressor 18 compresses hot vapor to line 20 through reversing valve 22 to line 52 through reversing valve 50 to line 80 through normal heat pump water heater through valve 82 through one-way valve 84 to line 86 to line 40 through bypass 62 through valve 68, to line 70 through expansion valve 72 through evaporator coil 6 where it picks up heat by blower 2, exits as a hot vapor to line 74 through reversing valve 26 to line 24 through reversing valve 22 to line 54 through valve 77 to compressor 18, which is cooled through line 76 and temperature sensor 78, to be recycled until vapor sensor 82 or water heater thermostat is satisfied or building thermostat calls for heat.

Figure 10:
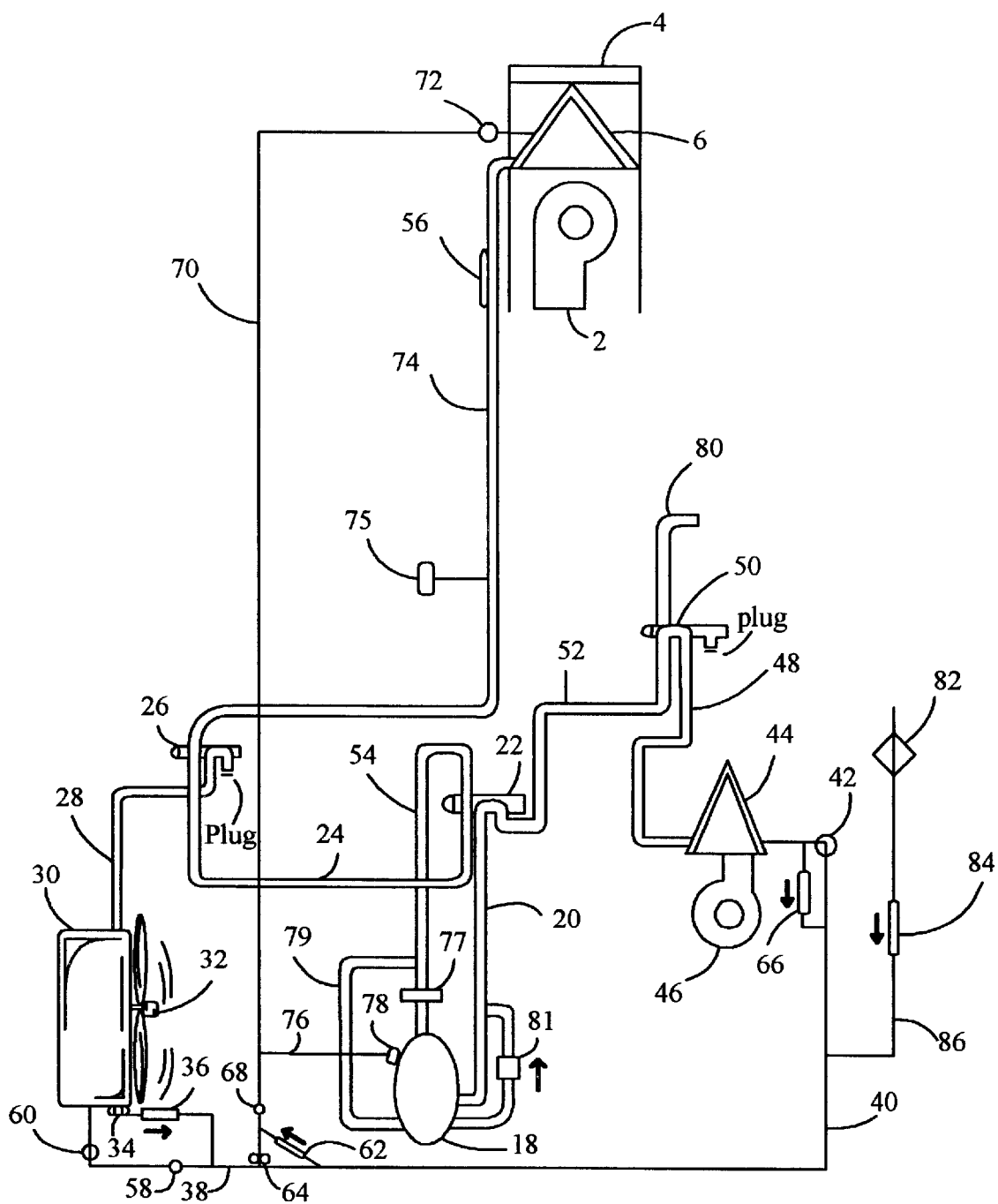
FIG. 10 is a schematic diagram like that shown in FIG. 8 with the compressor bypassed and a pump being used in its stead.

FIG. 10 shows the system of the present invention operating with the conventional heat pump compressor bypassed. Sensor 56 senses attic evaporator coil 6 to be a higher temperature than outside evaporator coil 30, shifts reversing valve 26 to attic mode, closes valve 58, opens valve 68, and turns off fan 32. The thermostat energizes water heater thermostat isolation switch, turns on blower 46 and through sensor 56 turns on blower 2, and through sensor 75 closes compressor bypass valve 77 and turns on pump 64. Pump 64 pumps liquid refrigerant through valve 68 to line 70 through expansion valve 72 through evaporator coil 6 where heat is picked up by blower 2 and exits as a hot vapor to line 74 through reversing valve 26 to line 24 through reversing valve 22 to line 54 through compressor bypass line 79 through one-way valve 81 to line 20 through reversing valve 22 to line 52 through reversing valve 50 to line 48 through condenser 44 where heat is removed by blower 46 and exits as a liquid through one-way valve 66 to line 40 to pump 64 to be recycled.

Figure 11:
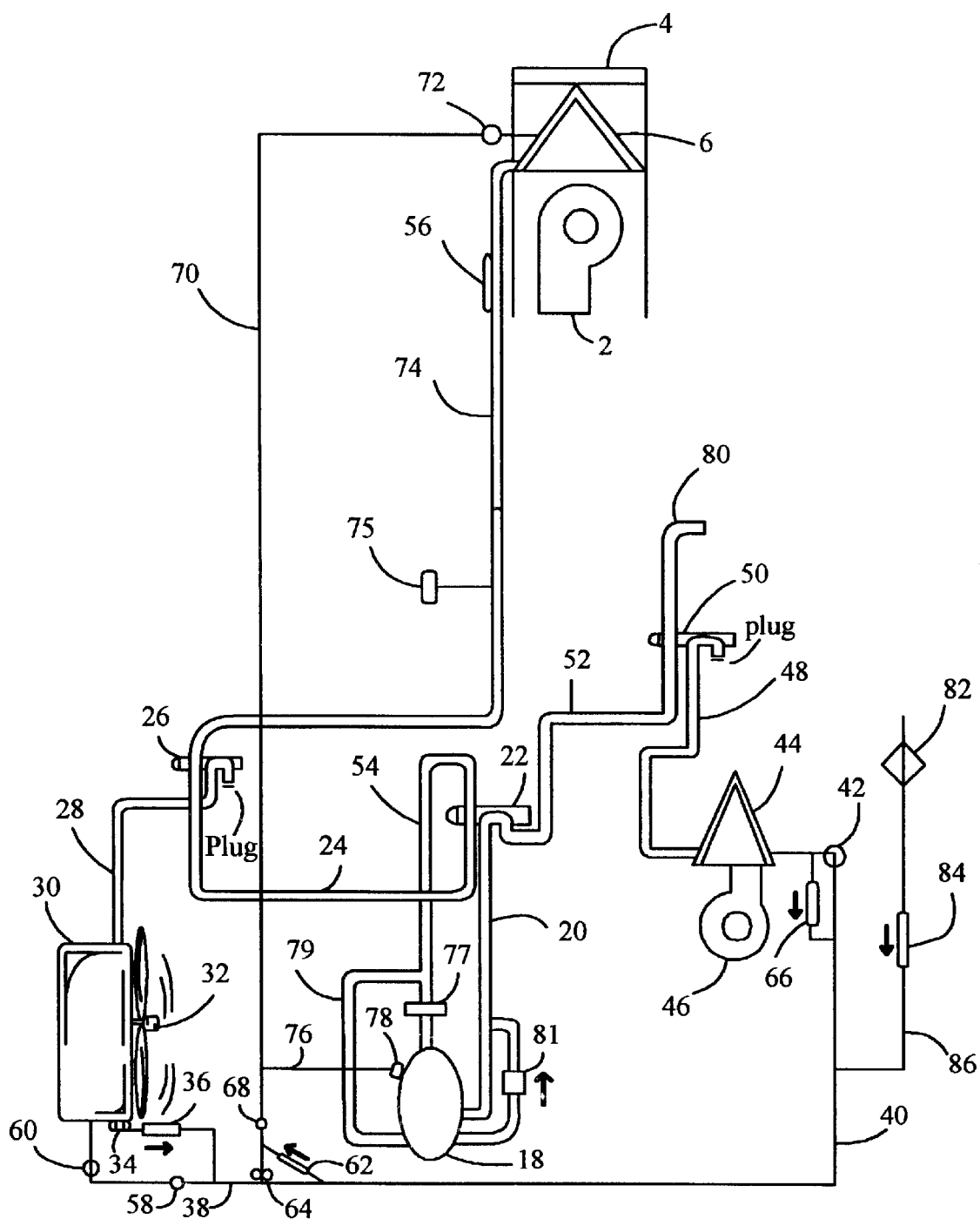
FIG. 11 is schematic diagram like that shown in FIG. 10 with the system of the present invention being used to heat water.

FIG. 11 shows the system of the present invention operating with the conventional heat pump compressor bypassed and being used to heat water. Sensor 56 senses attic evaporator coil 6 to be a higher temperature than outside evaporator coil 30, shifts reversing valve 26 to attic mode, closes valve 58, opens valve 68 and turns off fan 32. The hot.water heater thermostat shifts reversing valve 50 to water heat mode, and through sensor 56 turns on blower 2 and through sensor 75 turns on pump 64, and closes compressor bypass valve 77. Pump 64 pumps liquid refrigerant through valve 68 to line 70 through expansion valve 72 through evaporator coil 6 where heat is picked up by blower 2 and exits as a hot vapor to line 74 through reversing valve 26 to line 24 through reversing valve 22 to line 54 through compressor bypass line 79 through one-way valve 81 to line 20 through reversing valve 22 to line 52 through reversing valve 50 to line 80 through normal heat pump water heater through valve 82 through one-way valve 84 to line 86 to line 40 to pump 64 to be recycled.

Figure 12:
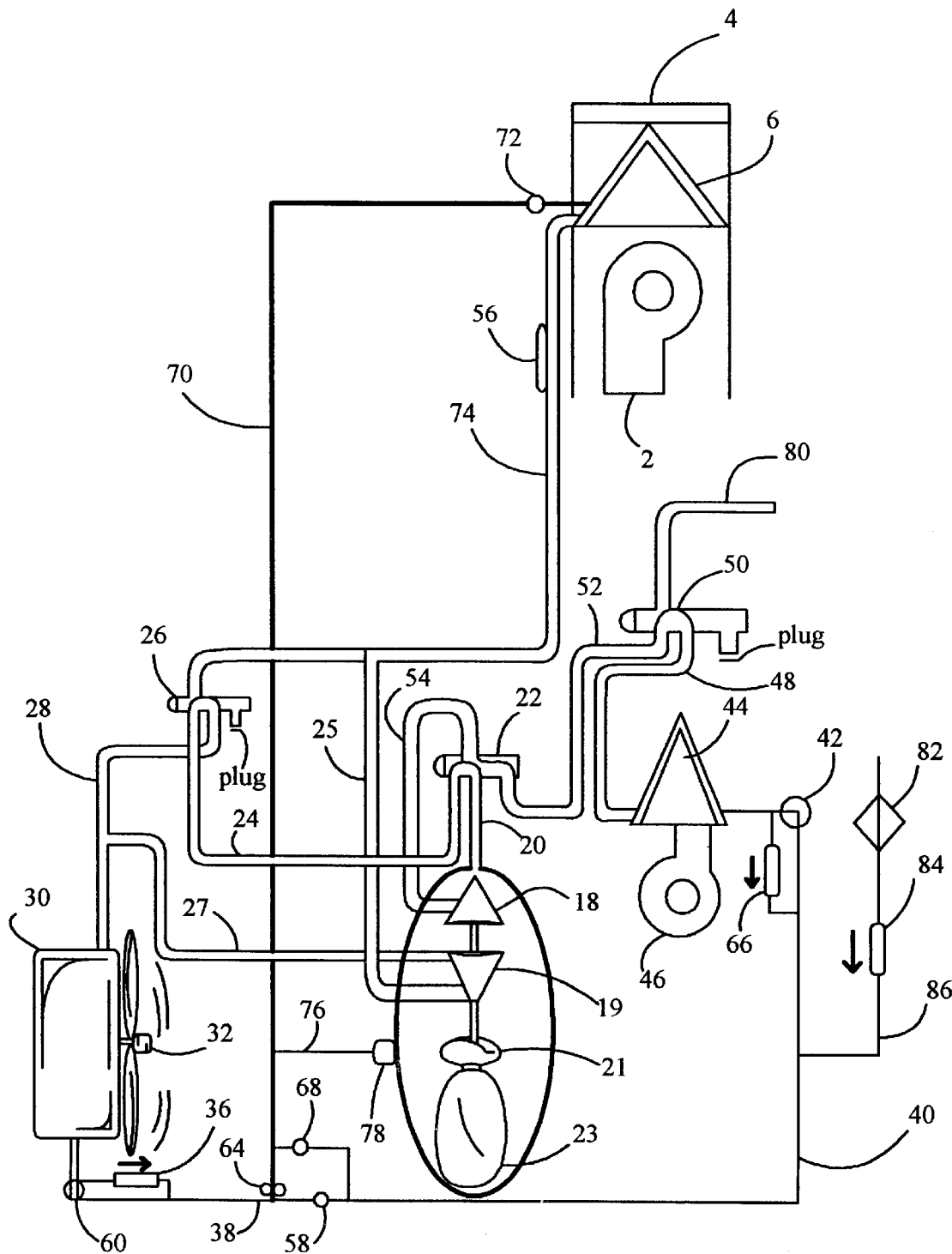
FIG. 12 is a schematic diagram of the system of the present invention being used to drive a heat engine/compressor with an assisting motor capable of supplying all power needed by the compressor in the cooling mode.

FIG. 12 shows the system of the present invention being used to power a heat engine that will drive a compressor of the heat pump in the cooling mode with a back-up electric motor. Heat sensor 56 senses that attic heat is adequate to supply energy to heat engine 19 shifts reversing valve 26. When energy is sufficient, the assist motor 23 isolation switch is activated. The thermostat turns on blower 2 through sensor 56, energizes heat cool reversing valve 22, water heating reversing valve 50, starts fan 32, blower 46, pump 64, closes valve 58 and opens valve 68. Liquid refrigerant is pumped by pump 64 to line 70 through expansion valve 72 through evaporator coil 6 where heat is picked up by blower 2 and exits as a hot vapor to line 74 to line 25 through heat engine (19) to line 27 to line 28 through condenser 30 where heat is removed by fan 32 and exits.as a liquid through one-way valve 36 to line 38 to pump 64 to be recycled. Pump 64 also pumps liquid refrigerant through valve 68 to line 40 through expansion valve 42 through evaporator coil 44 where heat is removed by blower 46 and exits as a vapor to line 48 through reversing valve 50 to line 52 through reversing valve 22 to line 54 through compressor 18 to line 20 through reversing valve 22 to line 24 through reversing valve 26 to line 28 through condenser 30 where heat is removed by fan 32 and exits as a liquid through one-way valve 36 to line 38 to pump 64 to be recycled. Unit is cooled by line 76 and temperature sensor 78.

Figure 13:
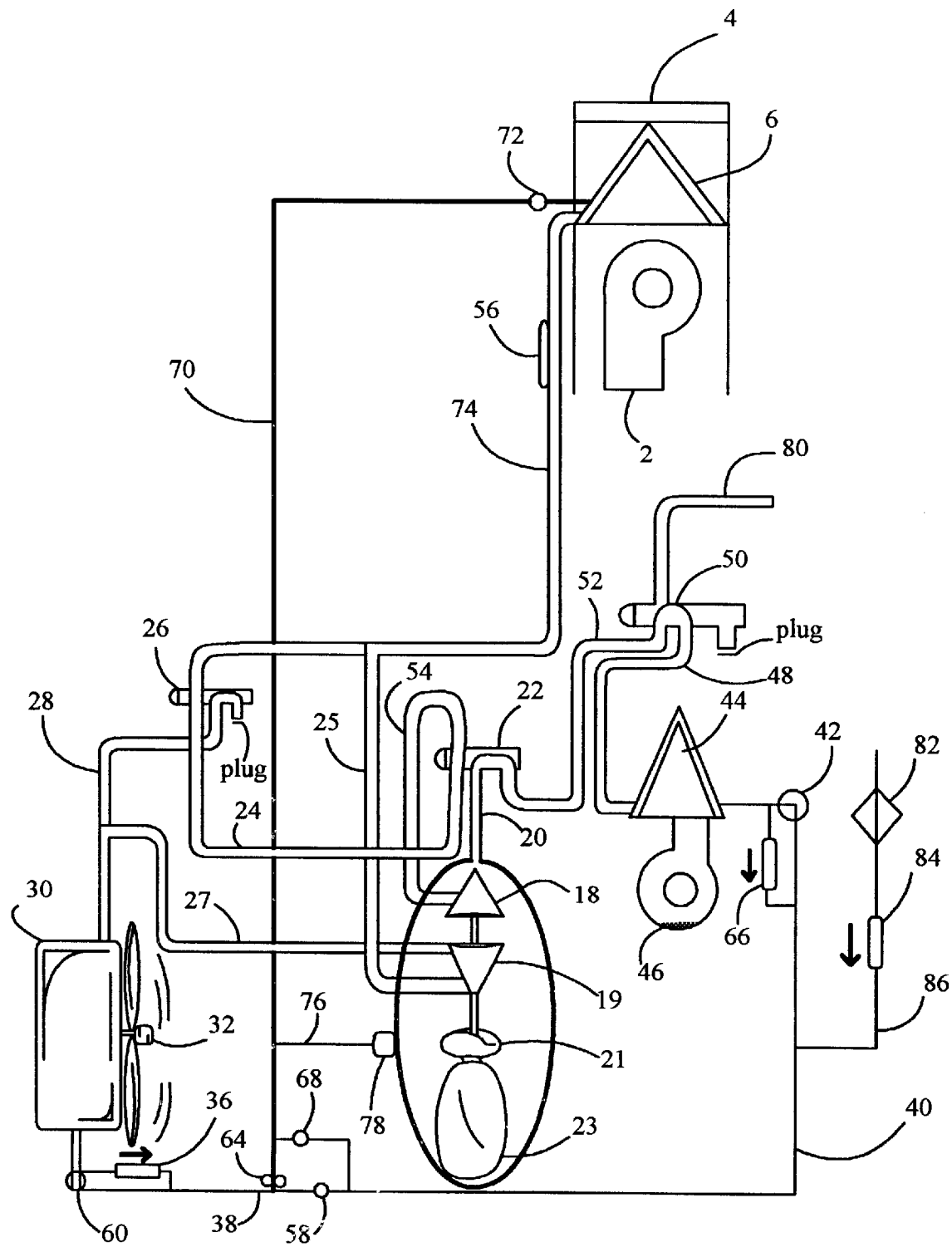
FIG. 13 is a schematic diagram like that shown in FIG. 12 with the system used in the heating mode.

FIG. 13 shows the system of the present invention being used to power a heat engine that will drive the compressor of the heat pump in the heating mode with a back-up electric motor. Heat Sensor 56 senses that attic heat is adequate to supply energy to heat engine 19 shifts reversing valve 26. When energy supply is adequate the assist-motor 23 isolation-switch is energized. The thermostat turns on fan 32, blower 46, and through heat sensor 56 energizes water heater reversing valve 50, turns on blower 2, and starts pump 64. Liquid refrigerant is pumped by pump 64 to line 70 through expansion valve 72 through evaporator coil 6 where heat is picked up by blower 2 and exits as a vapor to line 74 through reversing valve 26 to line 24 through valve 22 to line 54 through compressor 18 to line 20 through reversing valve 22 to line 52 through reversing valve 50 to line 48 through condenser coil 44 where heat is removed by blower 46 and exits as a liquid through one-way valve 66 to line 40 through valve,58 to pump 64 to be recycled. Line 74 also supplies line 25 through heat engine 19 to line 27 to line 28 through condenser 30 where heat is removed by fan 32 and exits as a liquid through one-way valve 36 to line 38 through pump 64 to be recycled. Unit is cooled by line 76 and temperature sensor 78.

Figure 14:
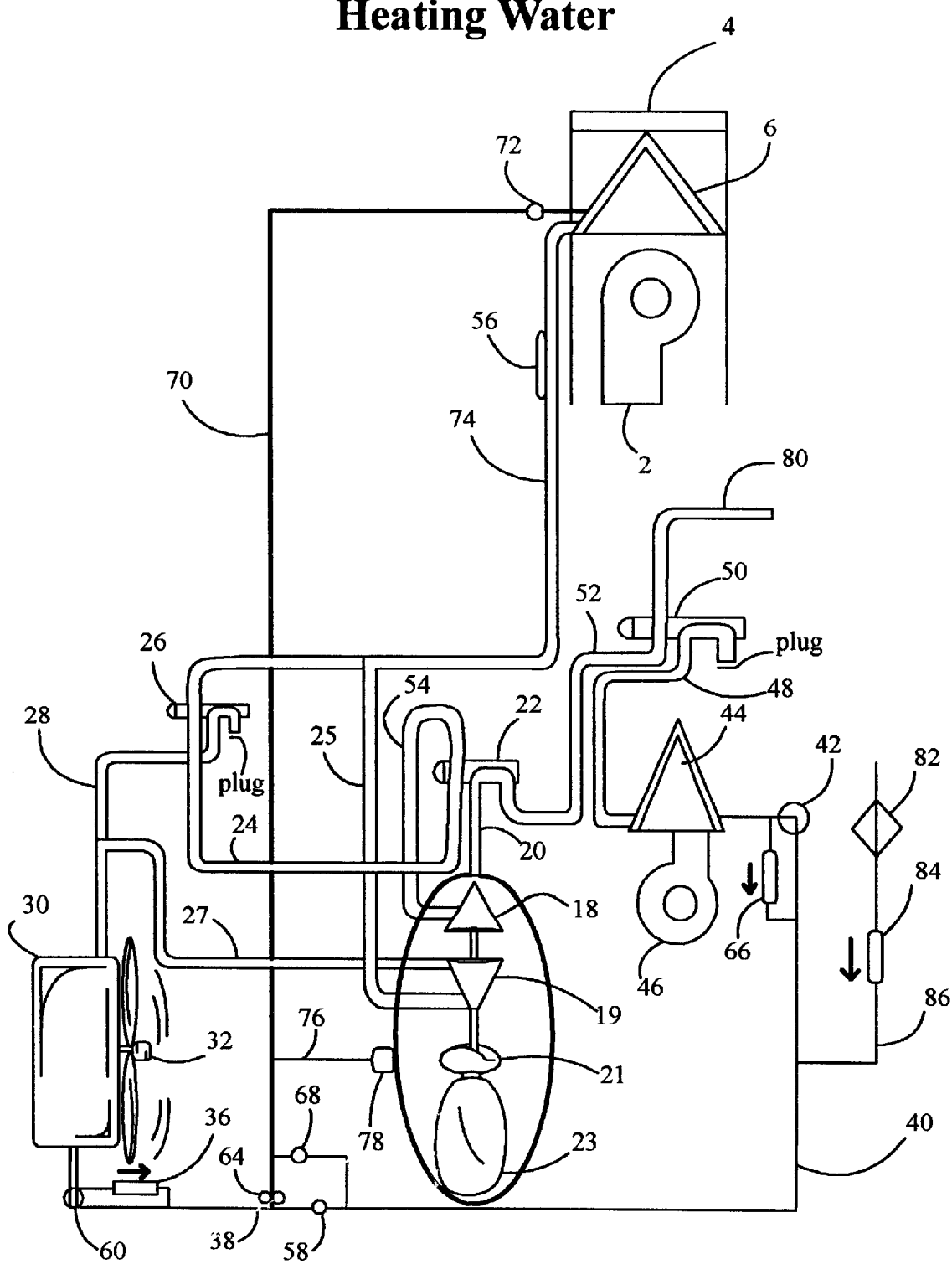
FIG. 14 is, a schematic diagram like that shown in FIG. 13 with the system in the heat water mode.

FIG. 14 shows the system of the present invention used in a water heat mode. Heat sensor 56 senses attic heat adequate to supply all energy requirements to heat engine 19, energizes the assist-motor 23, isolation-switch. The water heater thermostat starts fan 32, pump 64 and blower 2 through sensor 56. Pump 64 pumps liquid refrigerant to line 70 through expansion valve 72 and through evaporator coil 6 where heat is picked by blower. 2 and refrigerant exits as a vapor to line 74 through reversing valve 26 to line 24 through reversing valve 22 to line 54 through compressor 18 to line 20 through reversing valve 22 to line 52 through reversing valve 50 to line 80 through normal heat pump water heater through valve 82 through one-way valve 84 to line 86 to line 40 through valve 58 to pump 64 to be recycled. Line 74 also supplies line 25 through heat engine 19 to line 27 to line 28 through condenser 30 where heat is removed by fan 32 and exits as a liquid through one-way valve 36 to line 38 to pump 64 to be recycled. Unit is cooled by line 76 and temperature sensor 78.

Figure 15:
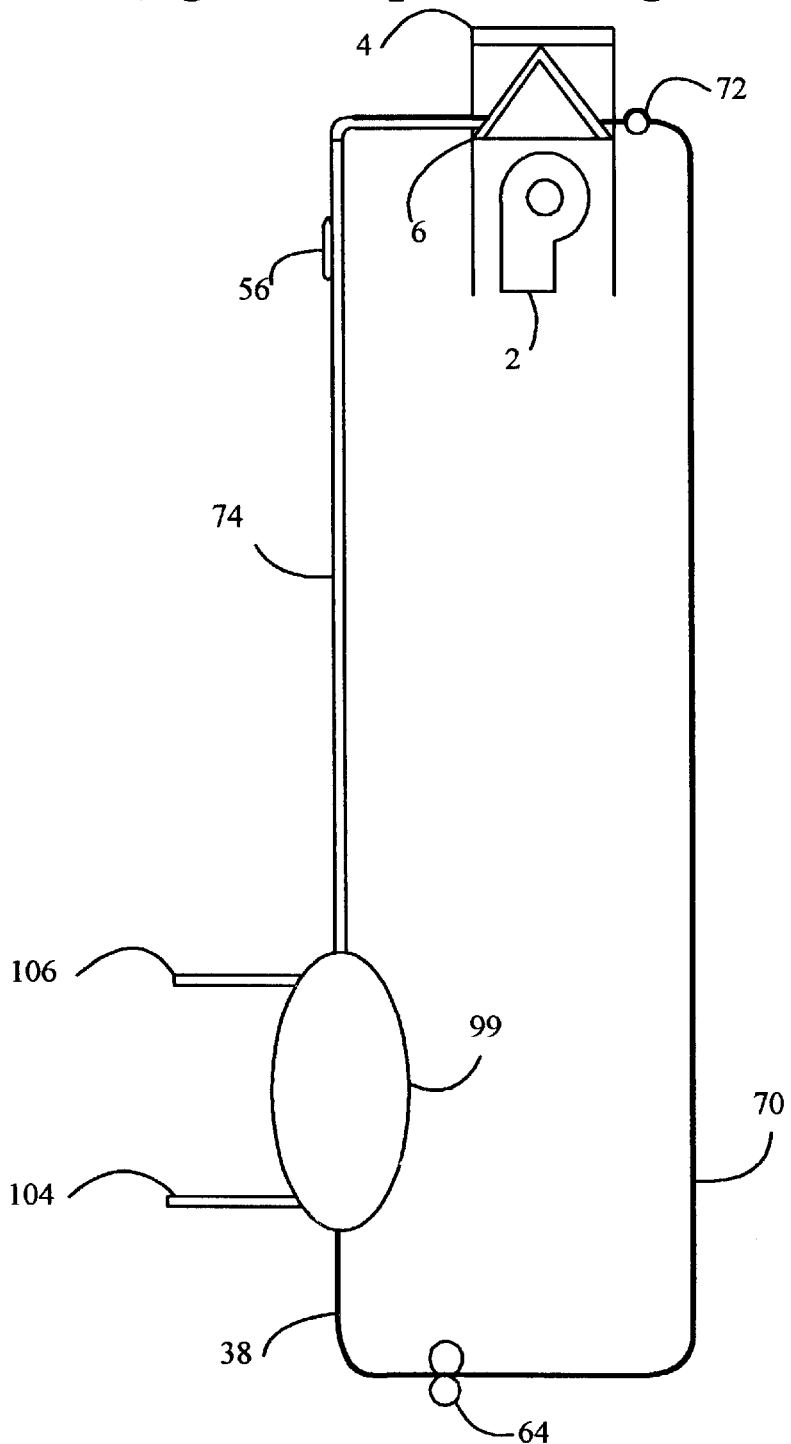
FIG. 15 is a schematic diagram of the system of the present invention being used to heat water or another medium only.

FIG. 15 shows the system of the present invention being used to heat water or another medium. Heat sensor 56, senses attic temperature is adequate to supply energy to heat exchanger 99 and turns on pump 64, and blower 2. Liquid refrigerant is pumped by pump 64 to line 70 through expansion valve 72 through evaporator coil 6 where heat is picked up by blower 2 and exits as a hot vapor to line 74 through vapor water heat exchanger condenser 99 and exits line 38 to pump 64 to be recycled. Water is pumped in line 104 through heat exchanger 99 and out line 106 as heated water.

Figure 16:
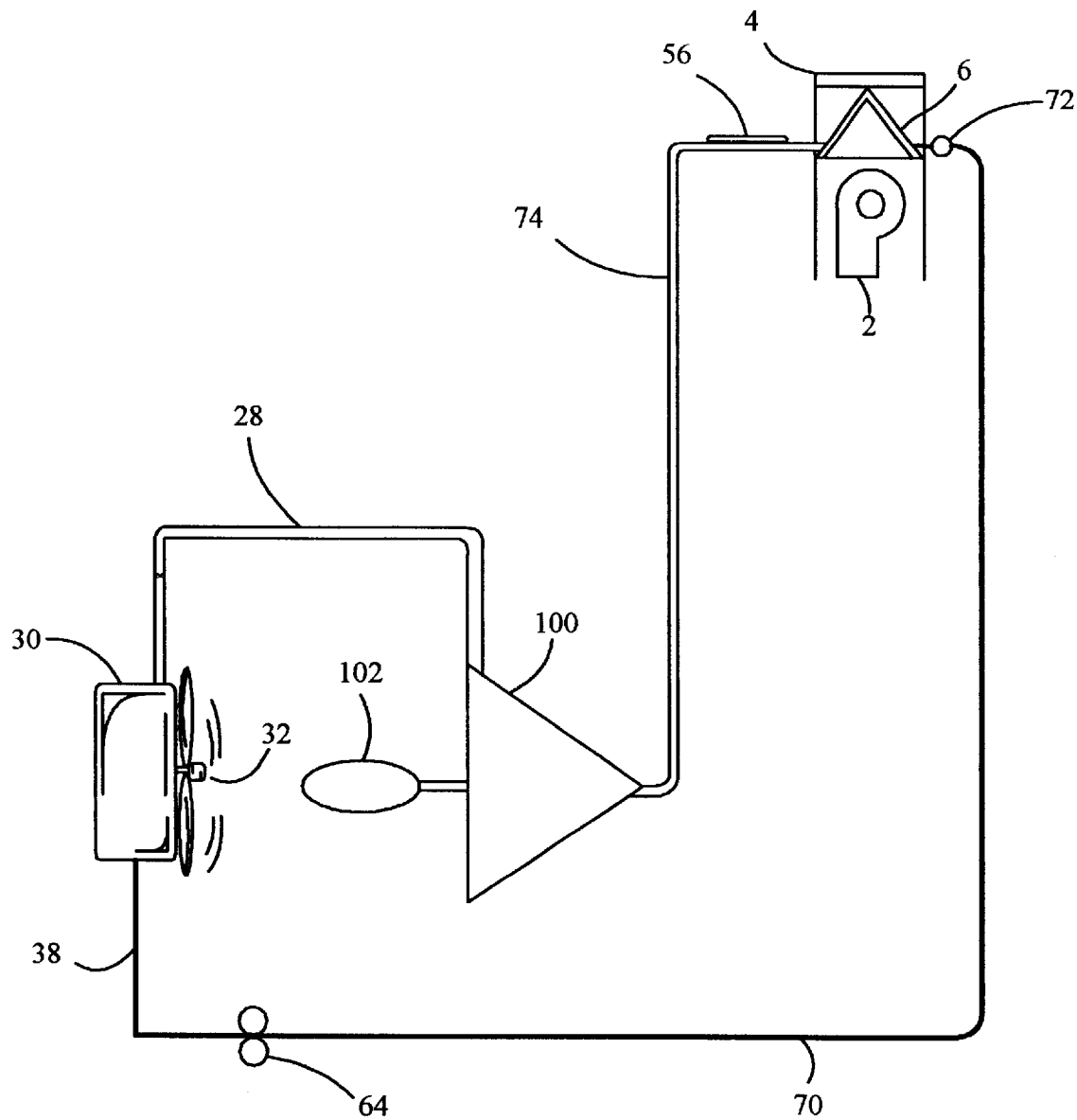
FIG. 16 is a schematic diagram of the system of the present invention being used to power a generator.

FIG. 16 shows the system of the present invention being used to power a generator. Heat sensor 56, senses attic temperature is adequate to supply energy to heat engine 100 and turns on pump 64, blower 2 and fan 32. Liquid refrigerant is pumped through pump 64 to line 70 through expansion valve 72 through evaporator 6 where heat is picked up by blower 2 and exits as a hot vapor to line 74 through heat engine 100 to line 28 through condenser 30 where heat is removed by fan 32 and exits as a liquid to line 38 to pump 64 to be recycled. Generator 102 generates ac or dc power.

Compressor 201 draws vapor through line 202 from reversing valve 203 and line 204 from tank 205 and compresses this vapor through line 206 to reversing valve 203 and out through line 207. This places desired head pressure on liquid at the bottom of tank 205 allowing liquid refrigerant to flow from condenser to fill tank 205, by way of line 209 and check valve 210. Liquid refrigerant flows under pressure from bottom of tank 208 through check valve 211 to line 212 through check valve 213 and pressure tank 214 to line 70 to expansion valve 72. When liquid in tank 208 becomes low, float valve 211 sends a signal to reversing valve 203 causing reversing valve 203 to shift. Now compressor 201 draws vapor through line 202 to reversing valve 203 and line 207 from tank 208 and compresses this vapor through line 206 to reversing valve 203 and out line 204 to tank 205 placing desired head pressure on liquid at the bottom of tank 205 at the same time reducing the pressure on the liquid at the bottom of tank 208, allowing liquid refrigerant to flow from condenser to tank 208 by way of line 209 and line 215 and check valve 216. Liquid refrigerant under pressure flows from bottom of tank 205 through check valve 217, line 212 through check valve 213 and pressure tank 214 to line 70 and expansion valve 72. When liquid in tank 205 becomes low, float valve 218 in tank 204 sends a signal to reversing valve 203 causing the reversing valve to shift, which starts a new cycle. Compressor 201 may be turned off after the system is up to full system pressure.

Thus it can be seen that an improvement to heating and cooling system for houses and buildings has been provided that will meet all of the advantages of prior art devices and offer additional advantages not heretofore achievable. With respect to the present invention, the optimum dimensional relationship to the parts of the invention including variations in size, materials, shape, form, function and manner of operation, use and assembly are deemed readily apparent to those skilled in the art, and all equivalent relationships illustrated in the drawings and used and described in the specification are intended to be encompassed herein.

The foregoing is considered as illustrative only of the principles of the invention. Numerous modifications and changes will readily occur to those skilled in the art, and it is not desired to limit the invention to the exact construction and operation shown and described. All suitable modifications and equivalents that fall within the scope of the appended claims are deemed within the present inventive concept.

What is claimed is:

1. In the attic or uppermost interior space of a building having a standard attic floor, an inside roof deck, exposed rafters with free lower edges, and supply or return air passageways to and from box end eaves where the rafters meet the standard attic floor; a loft or upper attic floor is placed in the uppermost part of the attic, running from one end of the building to the other above the standard attic floor; a heat barrier sheet material is fastened to the loft or upper attic floor and the free lower edges of the rafters from the loft or upper attic floor to the standard attic floor, thus forming airflow channels between the rafters, the roof and the heat barrier material; a wall or partition is placed in the center of the space formed above the loft or upper attic floor to create two spaces; a blower is positioned in said partition having an input side connected with a first area and an output side connected with a second area; an evaporator coil is positioned adjacent the input side of the blower; the blower drawing hot air from the first area above the attic floor, through the evaporator coil, through the blower input side and out the output side into the second area of the loft or upper attic floor, through te boxed eaves to the other end of the building, and up through the formed channels, picking up solar heat from the roof, into the first area of the upper attic floor and back to the blower in a closed loop; a refrigerant is used to capture the BTUs absorbed by the evaporator coil; a compressor then converts this warm vapor to hotter compressed vapor, and transfers these BTUs to a condenser where the latent heat can be used to heat a house, building, or water before returning as a liquid to the evaporator to be recycled.

2. A system as claimed in claim 1 for use on a roof in which due to the movement of the sun, one side of the roof is hotter than the other for just a portion of the day, the system using two blower coil units to harness the solar energy or heat absorbed by the roof, the blower on the hotter side being used while the blower on the cooler side remains idle.

3. A system as claimed in claim 1, being retrofitted to an existing heat pump, said existing heat pump continuing to operate in a normal manner in the cooling mode.

4. A system as claimed in claim 1, being retrofitted to an existing heat pump, said existing heat pump continuing to operate in a normal manner in the heating mode.

5. A system as claimed in claim 1, being retrofitted to an existing heat pump with the outside fan of the existing heat pump being turned off and the attic system operating to reduce required compressor work.

6. A system as claimed in claim 1, being retrofitted to an existing heat pump with the outside fan of the existing heat pump being turned off and the attic system operating, the system being used to preheat water.

7. A system as claimed in claim 1, being retrofitted to an existing heat pump with the outside fan of the existing heat pump being turned off and the attic system operating, the refrigerant leaving the attic evaporator coil being hot enough to supply heat to the house, the refrigerant being pumped through the system by a pump bypassing the compressor.

8. A system as claimed in claim 1, being retrofitted to an existing heat pump with the outside fan of the existing heat pump being turned off and the attic system operating, the refrigerant leaving the attic evaporator coil being hot enough to preheat water, the refrigerant being pumped through the system by a pump bypassing the compressor.

9. A system as claimed in claim 1, used to drive a heat engine/compressor to cool the house or building.

10. A system as claimed in claim 1, used to drive a heat engine/compressor to heat the house or building.

11. A system as claimed in claim 1, being used to heat water.

12. A system as claimed in claim 1, using a refrigerant pump to pump the refrigerant through the system to heat water or another medium such as in absorption refrigeration.

13. A system as claimed in claim 1, using a refrigerant pump to pump the refrigerant through the system to drive a heat engine and generator.

14. A system as claimed in claim 13 wherein the heated refrigerant flows into an air or water cooled condenser outside the building where heat is removed from the refrigerant and the refrigerant is returned as a liquid to the pump for recycling.

15. A system as claimed in claim 13, used to pump water for irrigation, watering livestock or domestic use.

16. A method for capturing the heat or energy absorbed by the roof of a building by creating a small air space under the roof, significantly smaller than the entire attic, moving the air by at least one fan or blower, the air space of a building being a part of a closed loop so that this air passes through at least one evaporator coil and returns by at least one return air duct to be recycled in said closed loop, at least one pump pumps water, antifreeze, oil or refrigerant through the at least one evaporator coil where it becomes a hot pressurized vapor and to at least one condenser where latent heat is removed from the water, antifreeze, oil or refrigerant to heat the building or water or other medium or to drive at least one heat engine before going to at least one outside condenser, returning as a liquid to at least one pump to be recycled.

17. The method of claim 16, further comprising at least one compressor placed in the system after said at least one evaporator coil to boost the temperature of the vapor.

18. A method as claimed in claim 1 using a group of buildings such as a farm, business or co-op having all systems tied together to drive at least one heat engine or other system.

* * * * *